US012603913B2

(12) United States Patent (10) Patent No.: US 12,603,913 B2
Teshome et al. (45) Date of Patent: Apr. 14, 2026

(54) SELECTING A TRANSMISSION PATH FOR COMMUNICATING DATA BASED ON A CLASSIFICATION FOR THE DATA

(71) Applicant: Dell Products L.P., Round Rock, TX (US)

(72) Inventors: Abeye Teshome, Austin, TX (US); Richard M. Tonry, Georgetown, TX (US); Adolfo Sandor Montero, Pflugerville, TX (US); Bassem El-Azzami, Austin, TX (US); Rajaravi Chandra Kollarapu, Allen, TX (US); Vinodkumar Vasudev Ottar, McKinney, TX (US); Luis Antonio Valencia Reyes, Waxahachie, TX (US); Mohit Arora, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 59 days.

(21) Appl. No.: 18/649,212

(22) Filed: Apr. 29, 2024

(65) Prior Publication Data

US 2025/0337766 A1 Oct. 30, 2025

(51) Int. Cl.
*H04L 9/40* (2022.01)
(52) U.S. Cl.
CPC ........ *H04L 63/1433* (2013.01); *H04L 63/107* (2013.01)
(58) Field of Classification Search
CPC .......................... H04L 63/1433; H04L 63/107
USPC .......................................................... 726/25
See application file for complete search history.

(56) References Cited

U.S. PATENT DOCUMENTS

| | | | |
|---|---|---|---|
| 8,042,182 B2 | 10/2011 | Milani Comparetti et al. | |
| 8,615,785 B2 | 12/2013 | Elrod et al. | |
| 8,924,620 B2 | 12/2014 | Harriman et al. | |
| 9,215,244 B2 | 12/2015 | Ayyagari et al. | |
| 9,734,169 B2 * | 8/2017 | Redlich .................. | G06F 16/21 |
| 10,176,308 B2 | 1/2019 | Mintz et al. | |
| 10,298,670 B2 | 5/2019 | Ben-Shael et al. | |
| 10,671,765 B2 | 6/2020 | Swierk et al. | |
| 11,036,902 B2 | 6/2021 | Nicholas | |

(Continued)

OTHER PUBLICATIONS

M. Shahraeini, A New Approach for Classification of Data Transmission Media in Power Systems; IEEE:2010; pp. 1-7.*

*Primary Examiner* — Monjur Rahim
(74) *Attorney, Agent, or Firm* — WOMBLE BOND DICKINSON (US) LLP

(57) ABSTRACT

Methods and systems for managing operations of a data processing system are disclosed. To manage operations of the data processing system, data may be obtained to be provided to a remote entity. Using a classification schema, a classification may be obtained for the data. A transmission path for the data may be selected based on at least the classification and a rule set keyed to the classification. A channel between the data processing system and the remote entity may be identified for transmission of the data. In a first instance of the identifying in which the channel is an in-band communication channel, the data may be provided to the remote entity via the in-band communication channel. In a second instance of the identifying in which the channel is an out-of-band communication channel, the data may be provided to the remote entity via the out-of-band communication channel.

20 Claims, 8 Drawing Sheets

(56)          References Cited

U.S. PATENT DOCUMENTS

| | | | |
|---|---|---|---|
| 11,102,122 | B2 | 8/2021 | Seed et al. |
| 11,134,380 | B2 | 9/2021 | Fox et al. |
| 11,487,274 | B2 | 11/2022 | Valder et al. |
| 11,792,267 | B2 | 10/2023 | Kreiner et al. |
| 2011/0087387 | A1 | 4/2011 | Safa-Bakhsh et al. |
| 2013/0304761 | A1* | 11/2013 | Redlich .................. G06F 16/21 |
| | | | 707/781 |
| 2018/0039946 | A1 | 2/2018 | Bolte et al. |
| 2021/0034048 | A1 | 2/2021 | Hajizadeh |
| 2021/0073211 | A1 | 3/2021 | Wright, Sr. |
| 2022/0038659 | A1* | 2/2022 | Michel ................ H04N 21/858 |
| 2022/0107937 | A1* | 4/2022 | Adivi ..................... G06N 20/00 |
| 2024/0172331 | A1* | 5/2024 | Koneru ................ H04W 76/45 |

* cited by examiner

SELECTING A TRANSMISSION PATH FOR COMMUNICATING DATA BASED ON A CLASSIFICATION FOR THE DATA

FIELD

Embodiments disclosed herein relate generally to managing a data processing system. More particularly, embodiments disclosed herein relate to systems and methods for managing communication capabilities of a data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
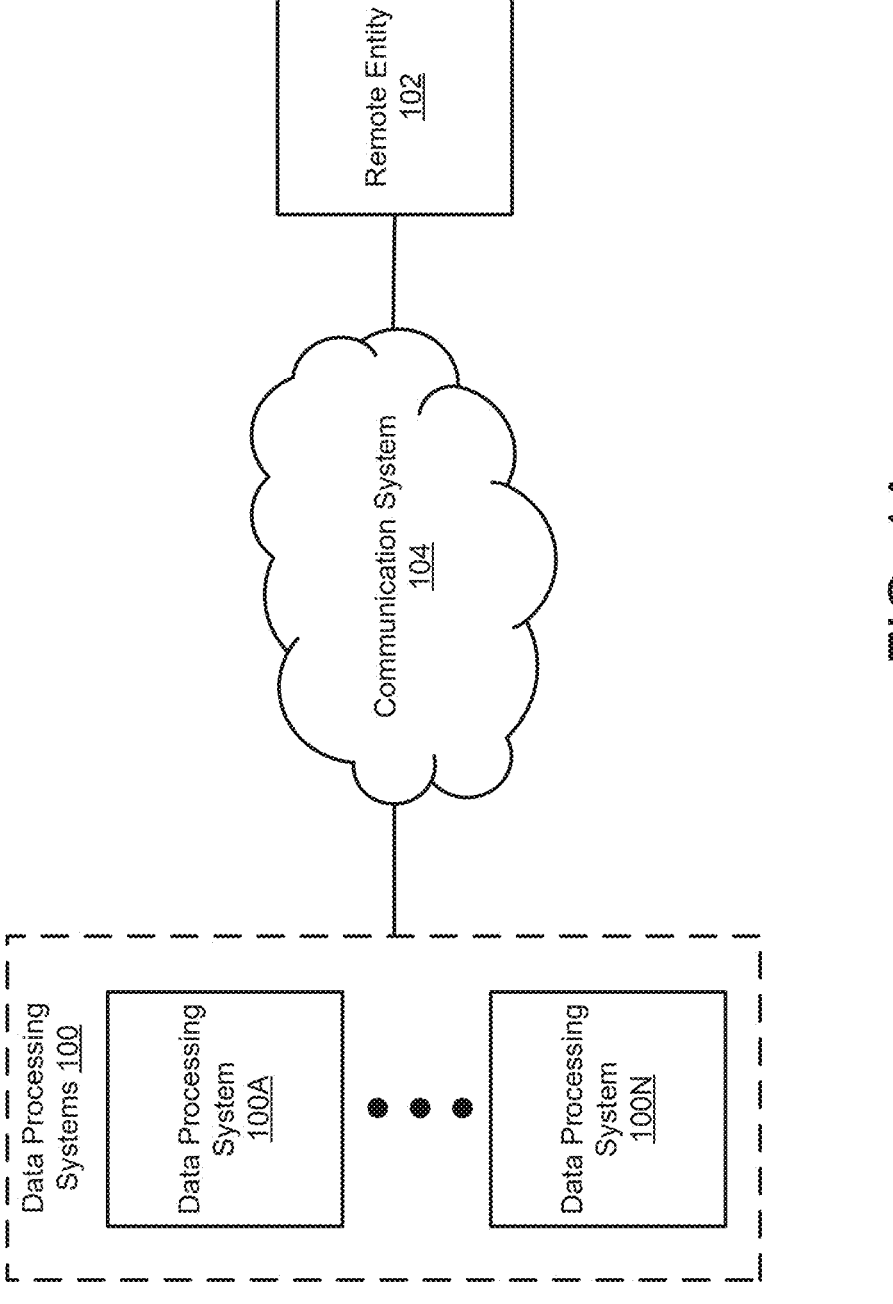
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing communication capabilities of a data processing system. The data processing system may provide any number of computer-implemented services. As part of providing the computer-implemented services, the data processing system may include any number of in-band hardware resources (e.g., a hard drive, a memory module, a processor) and/or out-of-band components (e.g., a management controller).

The data processing system may communicate (e.g., exchange data) with a remote entity which may provide any number of services for the data processing system (e.g., device management services, location-based services, security services). To communicate with the remote device, the data processing system may select a transmission path including a communication channel between the data processing system and the remote entity, which may include an in-band communication channel and/or an out-of-band communication channel.

The transmission path (e.g., including the in-band communication channel, including the out-of-band communication channel) used to transmit data to the remote entity may be determined based on the source of the data. For example, data generated by hardware resources (e.g., the in-band components) may be transmitted via a transmission path including the in-band communication channel, and/or data generated by the management controller (e.g., the out-of-band components) may be transmitted via a transmission path including the out-of-band communication channel.

However, selecting the transmission path based on the source of the data may result in communication delays, security breaches, and/or other negative outcomes. For example, the hardware resources may generate data with a high level of sensitivity (e.g., interception of the data by a malicious entity may pose a high security risk to the data processing system). In that case, transmitting the data through the out-of-band communication channel, rather than the in-band communication channel, may reduce a risk of the data being intercepted by a malicious entity.

Therefore, to avoid negative consequences associated with selecting the transmission path based on the source of the data, the transmission path may be selected based on a classification for the data. Selecting a transmission path based on the classification for the data may allow the data to be transmitted in a manner that takes into account the type of data, sensitivity level of the data, geographic location of the data processing system, level of trust in the remote entity, and/or other characteristics of the data.

Thus, embodiments disclosed herein may address, among other technical problems, the technical challenge of managing communication capabilities of a data processing system. By selecting a transmission path (e.g., including the in-band communication channel, including the out-of-band communication channel) for the data to be transmitted to a remote device based on a classification for the data, the data may be provided in a manner which meets data security requirements, ensures delivery of time-sensitive data, and utilizes network resources efficiently.

In an embodiment, a method for managing operation of a data processing system is disclosed. The method may include: obtaining data to be provided to a remote entity; obtaining, using a classification schema, a classification for the data; selecting, based on at least the classification and a rule set keyed to the classification, a transmission path for the data; identifying, based on the transmission path, a channel between the data processing system and the remote entity for transmission of the data; in a first instance of the identifying in which the channel is an in-band communication channel: providing, via the in-band communication channel, the data to the remote entity; and in a second instance of the identifying in which the channel is an out-of-band communication channel: providing, via the out-of-band communication channel, the data to the remote entity.

The classification may take into account, at least: a type of the data; a sensitivity level of the data; a geographic location of the data processing system; and a level of trust in the remote entity.

The type of data may include at least one type of data selected from a list consisting of: telemetry data; location data; security data; and user generated data.

The sensitivity level of the data may indicate a relative level of impact on processes performed by the data processing system should the data be intercepted by a malicious entity while the data is being provided to the remote entity.

The level of trust in the remote entity may indicate a likelihood that the remote entity will not act maliciously towards the data processing system, the level of trust being based on a trust grading system keyed to indicators of trust which the data processing system is able to evaluate.

Providing the data to the remote entity via the in-band communication channel may include: obtaining, by an agent hosted by hardware resources of the data processing system, data generated by the hardware resources; initiating, by the agent, generation of control data for the data, the control data being based, at least, on the classification, and the control data being usable to discriminate the transmission path from other transmission paths; providing the data and the control data to a network module of the data processing system; and transmitting, by the network module, the data to the remote entity via the in-band communication channel based at least on the control data.

The data processing system may include a network module adapted to separately advertise network endpoints for a management controller and hardware resources of the data processing system, the network endpoints being usable by the remote entity to address communications to the hardware resources using the in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and the in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The computer-implemented services may include any type and quantity of services including, for example, data services (e.g., data storage, access, and/or control services), communication services (e.g., instant messaging services, video-conferencing services), and/or any other type of service that may be implemented with a computing device. The computer-implemented services may be provided by, for example, data processing systems 100, remote entity 102, and/or any other type of devices (not shown in FIG. 1A). Other types of computer-implemented services may be provided by the system shown in FIG. 1A without departing from embodiments disclosed herein.

The system may include any number and/or type of data processing systems 100 (e.g., 100A-100N). Data processing systems 100 may include any number of in-band components, such as hardware resources (e.g., processors, memory modules, storage devices, communications devices). The hardware resources may support execution of any number and types of applications (e.g., software components). Changes in available functionalities of the hardware resources and/or software components may provide for various types of different computer-implemented services to be provided over time.

Data processing systems 100 may also include out-of-band components (e.g., management controllers), and functionality that may allow data exchange between the out-of-band components independently from the in-band components. For example, the out-of-band components may exchange data via out-of-band communications channels, and the in-band components may exchange data via in-band communication channels.

As part of providing the computer-implemented services, a data processing system (e.g., data processing system 100A) may communicate (e.g., exchange data) with a remote entity (e.g., remote entity 102). Data processing system 100A may include any number of communication channels usable to communicate with remote entity 102 (e.g., an in-band communication channel, an out-of-band communication channel). The communication channel used by data processing system 100A to provide data to remote entity 102 may be determined by the source of the data. For example, data from in-band components (e.g., hardware resources) may communicate with remote entity 102 via an in-band communication channel, and data from out-of-band components (e.g., the management controller) may communicate with remote entity 102 via an out-of-band communication channel.

For example, remote entity 102 may provide device health management services for data processing system 100A. To provide the device health management services, remote entity 102 may receive and monitor telemetry data (e.g., data regarding hardware resource performance, utilization, and/or health) from in-band components of data processing system 100A via an in-band communication channel. Remote entity 102 may be responsible for providing a response (e.g., computing instructions) to data processing system 100A if remote entity 102 detects an issue based on the telemetry data in order to update the operation of data processing system 100A.

Data processing system 100A may be moved from a first geographical location (e.g., a home of a user of data processing system 100A) to a second geographical location (e.g., an airport). At the airport, a communication network used by the in-band components of the data processing system to communicate with remote entity 102 (e.g., a Wi-Fi network) may have many users, resulting in high bandwidth consumption. As a result of the high bandwidth consumption, the network may experience latency, causing delays for in-band communications transmitted over the network. Communications transmitted via the out-of-band communication channel may be unaffected by in-band network latency.

While data processing system 100A is located at the airport, the in-band components of data processing system 100A may provide telemetry data to remote entity 102 via the in-band communication channel indicating that data processing system 100A is overheating (e.g., due to high CPU usage, a blocked cooling fan, cooling fan failure). However, due to the in-band network latency, remote entity 102 may not receive the communication in a timely manner, and thus may be delayed in providing a response. As a result, data processing system 100A may suffer permanent physical damage due to overheating leading to hardware resources becoming compromised and/or inoperable.

Operation of and/or computer-related services provided by data processing system 100A may be negatively impacted if the hardware resources become compromised and/or inoperable. For example, damaged hardware resources may result in (i) performance degradation, (ii) permanent loss of data, (iii) data processing system 100A being unable to boot up (e.g., due to no longer being able to read the operating system), and/or (iv) other outcomes which may negatively impact the operation of data processing system 100A. Thus, as a result of the damage to the hardware resources data processing system 100A may become inoperable and unable to provide any and/or a portion of the computer-implemented services.

In general, embodiments disclosed herein may provide methods, systems, and/or devices for managing communication capabilities of a data processing system. To manage the communication capabilities of a data processing system, a communication channel used to transmit data from the data processing system to a remote entity may be selected based on a classification for the data. For example, data to be provided to the remote entity may be obtained (e.g., by in-band components, by out-of-band components). The data may then be classified, taking into account information regarding data type and/or sensitivity, geographic location of the data processing system, a level of trust in the remote entity, and/or other characteristics of the data.

Using at least the classification and a rule set keyed to the classification, a transmission path for the data to be provided to the remote entity may be selected. The transmission path may include communication channels and entities within the data processing system which the data passes through in order to be provided to a remote entity. The data may be encapsulated with control data usable to discriminate the transmission path from other transmission paths (e.g., by a network module of the data processing system). Based on the transmission path, a channel between the data processing system and the remote entity (e.g., an in-band communication channel, an out-of-band communication channel) may be identified (e.g., by the network module), and the data may be transmitted to the remote entity via the identified channel.

By doing so, a system in accordance with an embodiment may increase the likelihood of selecting a communication channel (e.g., in-band, out-of-band) to transmit data to a remote entity based on a classification for the data. By selecting a communication channel based on a classification for the data, the system may meet data security requirements, ensure delivery of time-sensitive data, and utilize network resources efficiently, which may allow the computer-implemented services to be provided securely, reliably, and without delays.

To perform the above-mentioned functionality, the system of FIG. 1A may include data processing systems 100, and/or remote entity 102. Data processing systems 100, remote entity 102, and/or any other type of devices not shown in FIG. 1A may perform all, or a portion of the computer-implemented services independently and/or cooperatively. Each of these components is discussed below.

Data processing systems 100 may include any number and/or type of data processing systems (e.g., 100A-100N). Data processing systems 100 may include out-of-band components (e.g., a management controller), in-band components (e.g., hardware resources) and functionality that may allow data exchange between the out-of-band components cooperatively and/or independently from the in-band components of data processing systems 100. For more information regarding out-of-band components of data processing systems 100, refer to the discussion of FIG. 1B. For more information regarding in-band components of data processing systems 100, refer to the discussion of FIG. 1C.

The hardware resources (e.g., in-band components) of a data processing system (e.g., data processing system 100A) may assist in the operation of data processing system 100A. To perform its functionality, hardware resources may (i) store data in storage (e.g., user data, operating systems), (ii) read data from storage, (iii) obtain data from the management controller of data processing system 100A, (iv) generate data (e.g., data regarding the operation and/or performance of the hardware resources), (v) determine transmission paths for data (e.g., based on a classification for the data, refer to FIG. 2A), (vi) initiate encapsulation of the data with control data indicating the transmission path for the data, (vii) provide the data to a remote entity (e.g., via a network module), (viii) obtain data (e.g., computing instructions) from the remote entity in response, (ix) facilitate updating of the operation of data processing system 100A (e.g., based on the computing instructions), and/or (x) perform other actions related to assisting in the operation of data processing system 100A.

The management controller (e.g., out-of-band component) of data processing system 100A may provide device management services for data processing system 100A. To perform its functionality, the management controller may (i) obtain data from hardware resources of data processing system 100A, (ii) process, transform, and/or monitor the data, (iii) generate data (e.g., based on the data obtained from hardware resources 150), (iv) determine transmission paths for data (e.g., based on a classification for the data, refer to FIG. 2A), (v) initiate encapsulation of the data with control data indicating the transmission path for the data, (vi) provide the data to a remote entity (e.g., via a network module, via a network stack hosted by the management controller), (vii) obtain data (e.g., computing instructions) from the remote entity in response, (viii) facilitate updating of the operation of data processing system 100A (e.g., based on the computing instructions), and/or (ix) perform other actions related to providing the device management services.

The management controller and/or hardware resources of data processing system 100A may provide data (e.g., via the network module) to a remote entity (e.g., remote entity 102), which may participate in managing the operation of data processing system 100A. Remote entity 102 may include any number and/or type of remote entities (e.g., other data processing systems, servers, management systems, storage devices, user devices) that may provide computer-implemented services (e.g., device management services, location-based services, security services). To provide the computer-implemented services, remote entity 102 may communicate (e.g., exchange data) with data processing system 100A via out-of-band communication channels and/or in-band communication channels.

To perform its functionality, remote entity 102 may (i) obtain data from data processing system 100A (e.g., via out-of-band communication channels, via in-band communication channels), (ii) monitor, manage and/or store the data (e.g., in a repository, not shown), (iii) process and/or transform the data, (iv) provide responses to data processing system 100A (e.g., computing instructions based on the data), and/or (v) perform other tasks related to managing the operation of data processing system 100A.

Thus, data generated by in-band and/or out-of-band components of data processing system 100A may be transmitted to remote entity 102 responsible for providing device operation management services. The data may be communicated to remote entity 102 via in-band and/or out-of-band communication channels. By enabling data processing system 100A to communicate with remote entity 102 via either communication channel, a communication channel may be selected based on a classification for the data, which may account for any number of characteristics of the data. As a result, the system may optimize resources and meet requirements of the data, which may result in the computer-implemented services provided by data processing systems 100 being less likely to be delayed, interrupted, and/or compromised.

Figure 3:
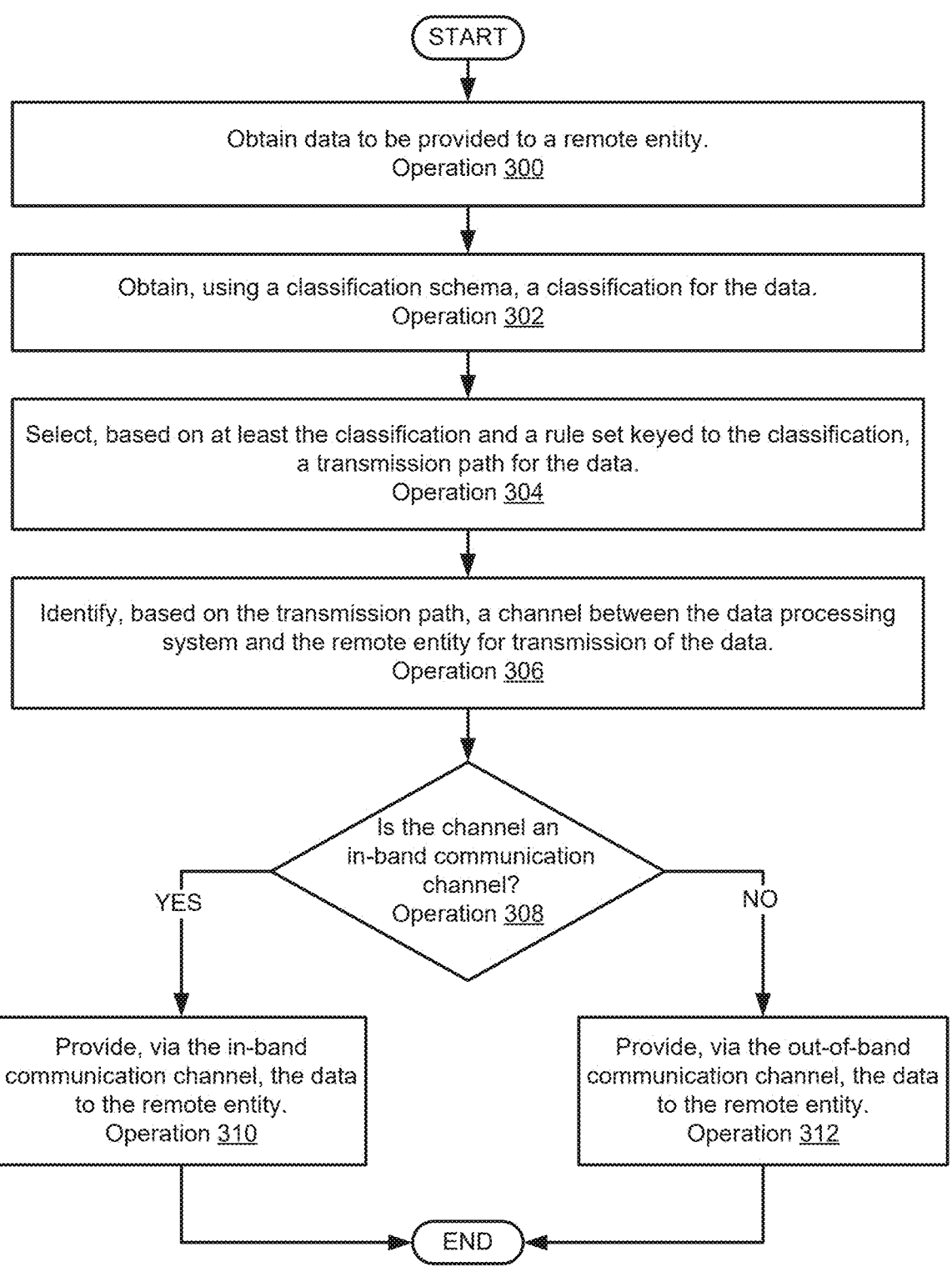
FIG. 3 shows a flow diagram illustrating a method of managing a data processing system in accordance with an embodiment.

When providing their functionality, any of data processing systems 100 and/or remote entity 102 may perform all, or a portion of the methods shown in FIG. 3.

Any of (and/or components thereof) data processing systems 100 and/or remote entity 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to FIG. 4.

In an embodiment, one or more of data processing systems 100 and/or remote entity 102 are implemented using an internet of things (IoT) device, which may include a computing device. The IoT device may operate in accordance with a communication model and/or management model known to data processing systems 100, remote entity 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single remote entity (e.g., 102), it will be appreciated that the system may include any number of remote entities.

Figure 1B:
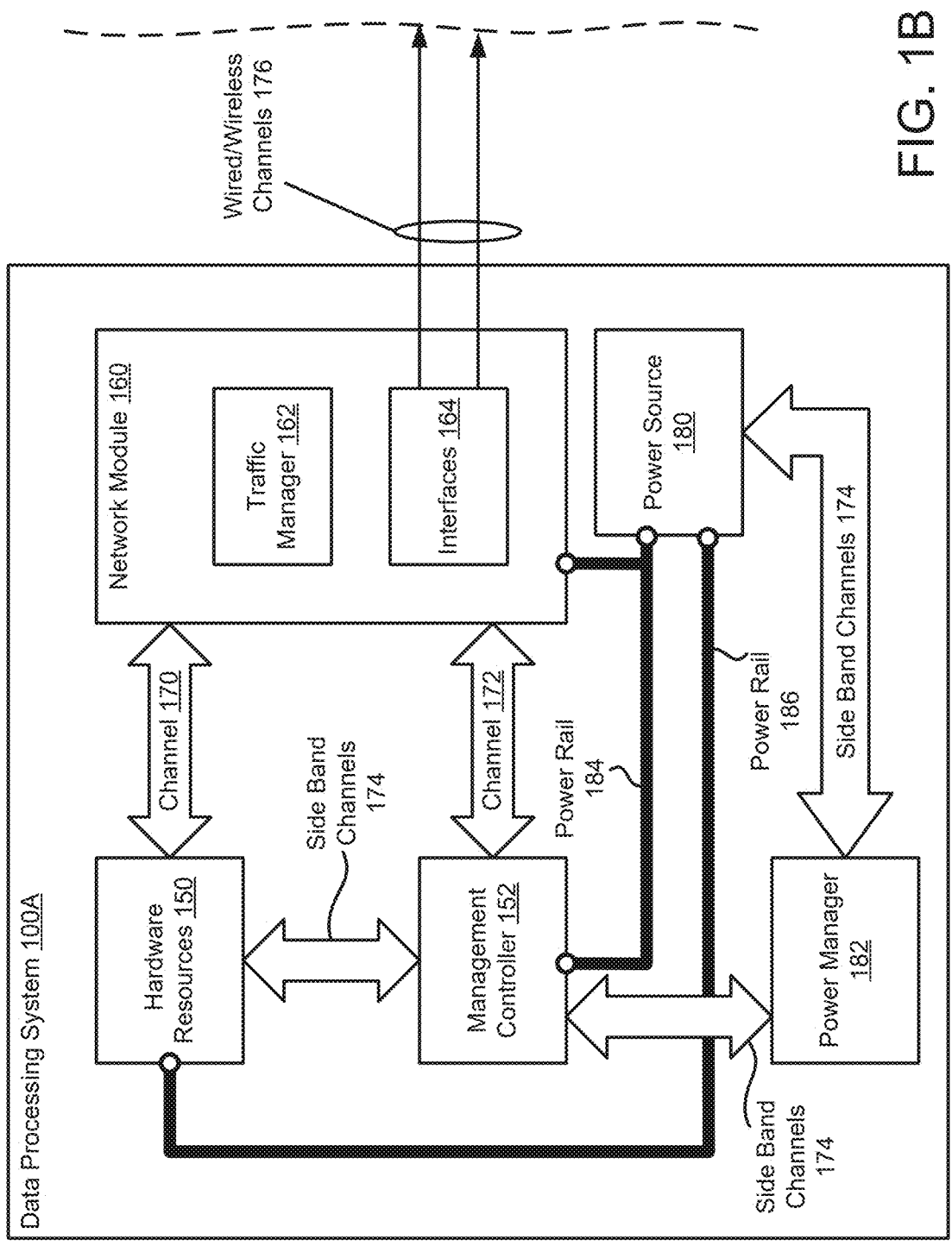
FIG. 1B shows a second block diagram illustrating a data processing system in accordance with an embodiment.

Turning to FIG. 1B, a diagram illustrating data processing system 100A in accordance with an embodiment is shown. Data processing system 100A may be similar to any of the data processing systems shown in FIG. 1A.

To provide computer implemented services, data processing system 100A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

Figure 1C:
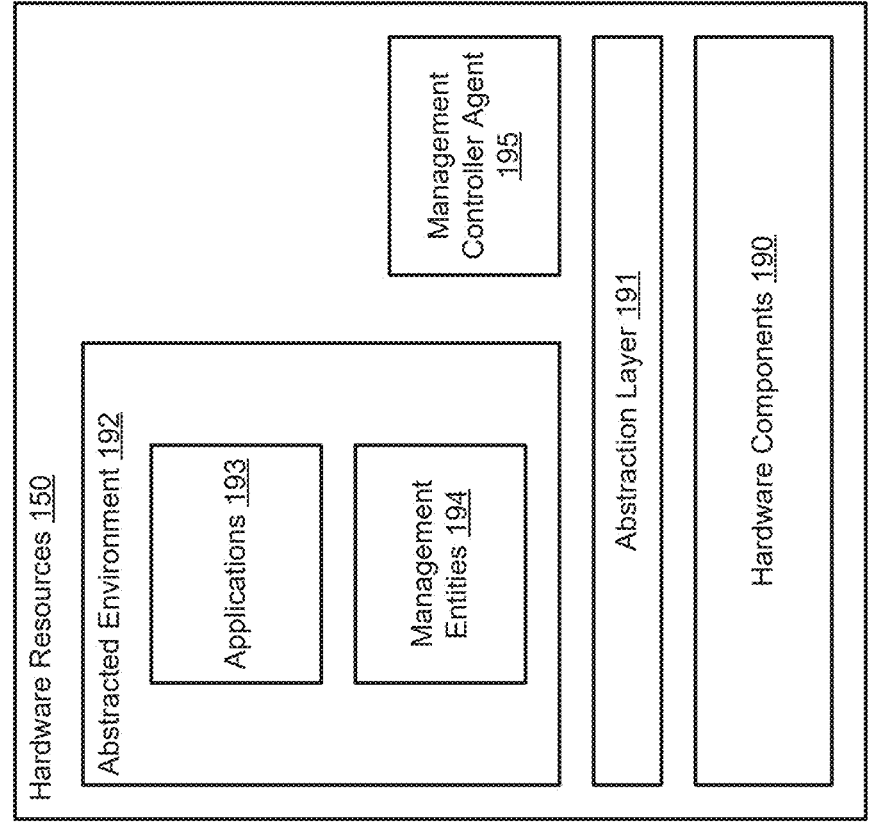
FIG. 1C shows a block diagram illustrating hardware resources of a data processing system in accordance with an embodiment.

The processor may also host various applications that provide the computer implemented services. The applications may utilize various services provided by the management entities and use (at least indirectly) the network stack to communicate with other entities. Refer to FIG. 1C for additional details regarding software entities that may be hosted by hardware resources 150.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

To reduce the likelihood of the applications and/or other in-band entities from being indirectly compromised, data processing system 100A may include management controller 152 and network module 160. Each of these components of data processing system 100A is discussed below.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band component, may manage power distribution, thermal management, and/or other functions of data processing system 100A.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

To facilitate communication with other devices, data processing system 100A may include network module 160. Network module 160 may provide communication services for in-band components (e.g., hardware resources 150) and out-of-band components (e.g., management controller 152) of data processing system 100A. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

Traffic manager 162 may also include functionality to direct traffic to/from data processing system 100A over various communication channels (e.g., of wired/wireless channels 176). To do so, for example, traffic manager 162 may perform packet processing and matching processes. To perform packet processing, traffic manager 162 may read control data included in a data package indicating a transmission path to transmit data to a remote entity (e.g., remote entity 102). Traffic manager 162 may use the control data to perform a matching process, during which a port (and corresponding communication channel) may be selected to transmit the data. The matching process may also take into account other factors, such as port congestion, whether the ports are labeled for certain uses, past port failures, etc.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a Wi-Fi card, a wireless local area network card, a wired local area network card, an optical communication card, and/or other types of communication components. These components may support any number of wired/wireless channels 176. Wired/wireless channels 176 may include any number of in-band communication channels and/or out-of-band communication channels which may be used to communicate with a remote entity (e.g., remote entity 102).

Thus, from the perspective of an external device, the in-band components and out-of-band components of data processing system 100A may appear to be two independent network entities, that may independently addressable, and otherwise unrelated to one another.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
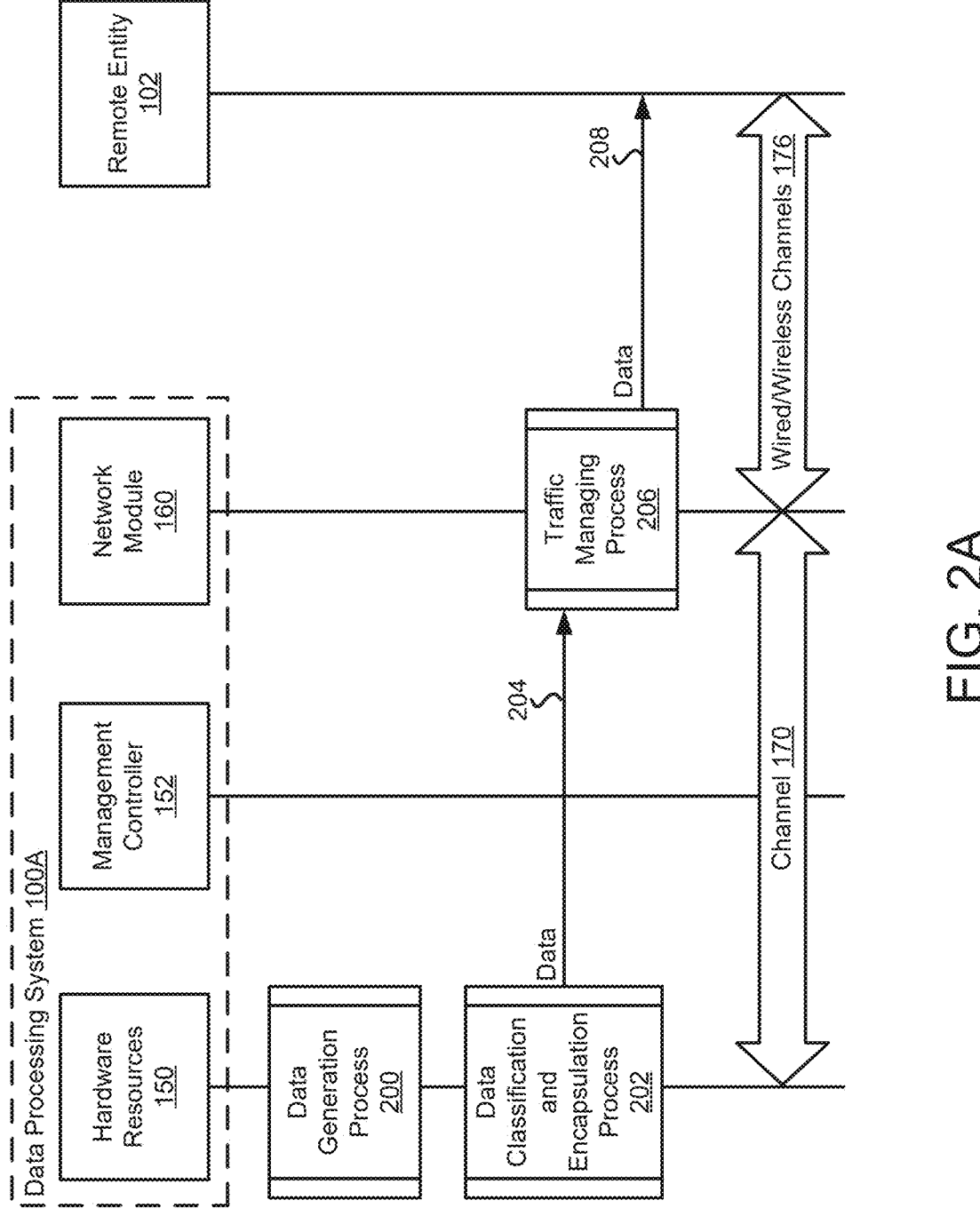
FIGS. 2A-2C show interaction diagrams in accordance with an embodiment.
Figure 2B:
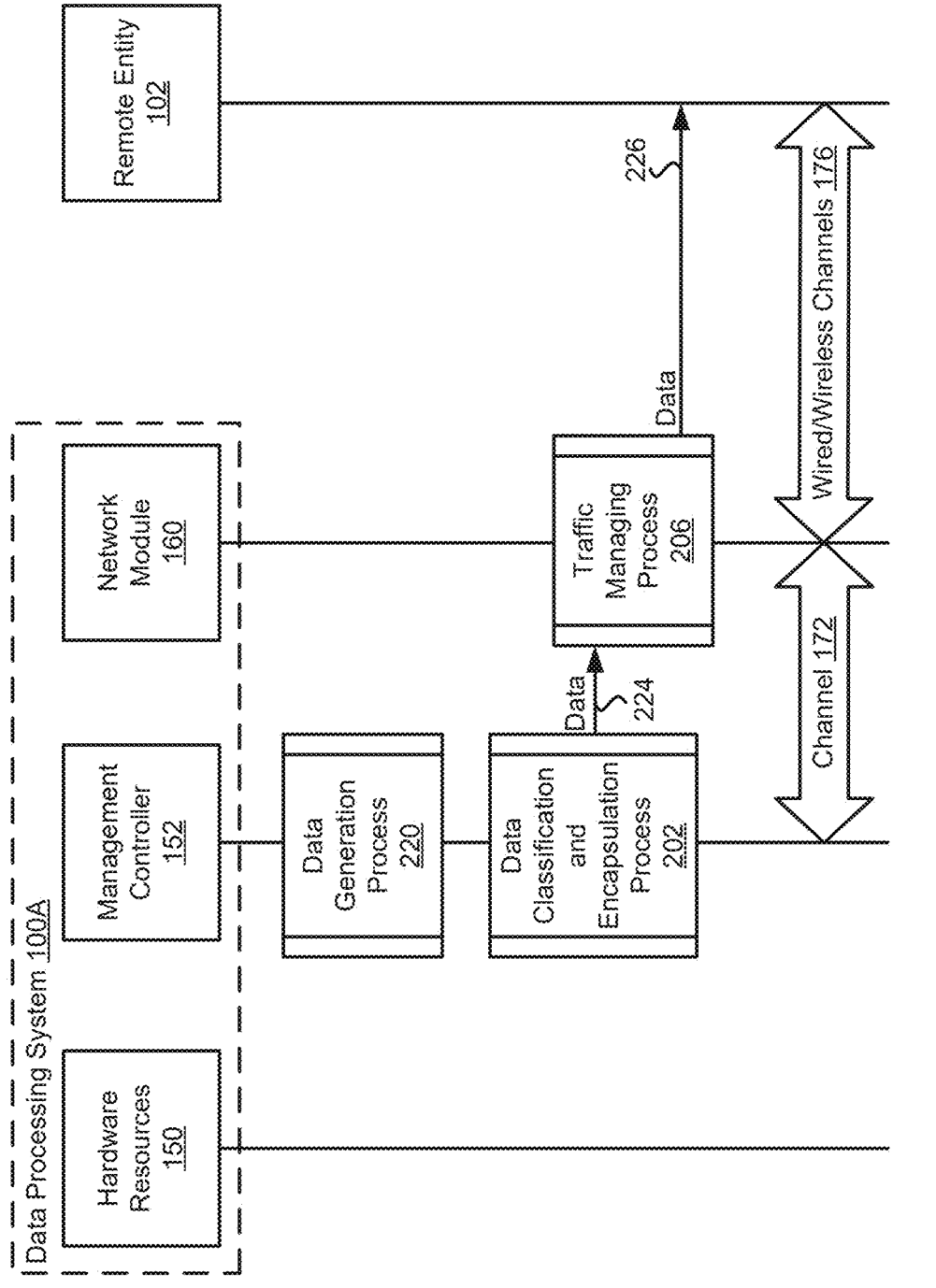
Figure 2C:
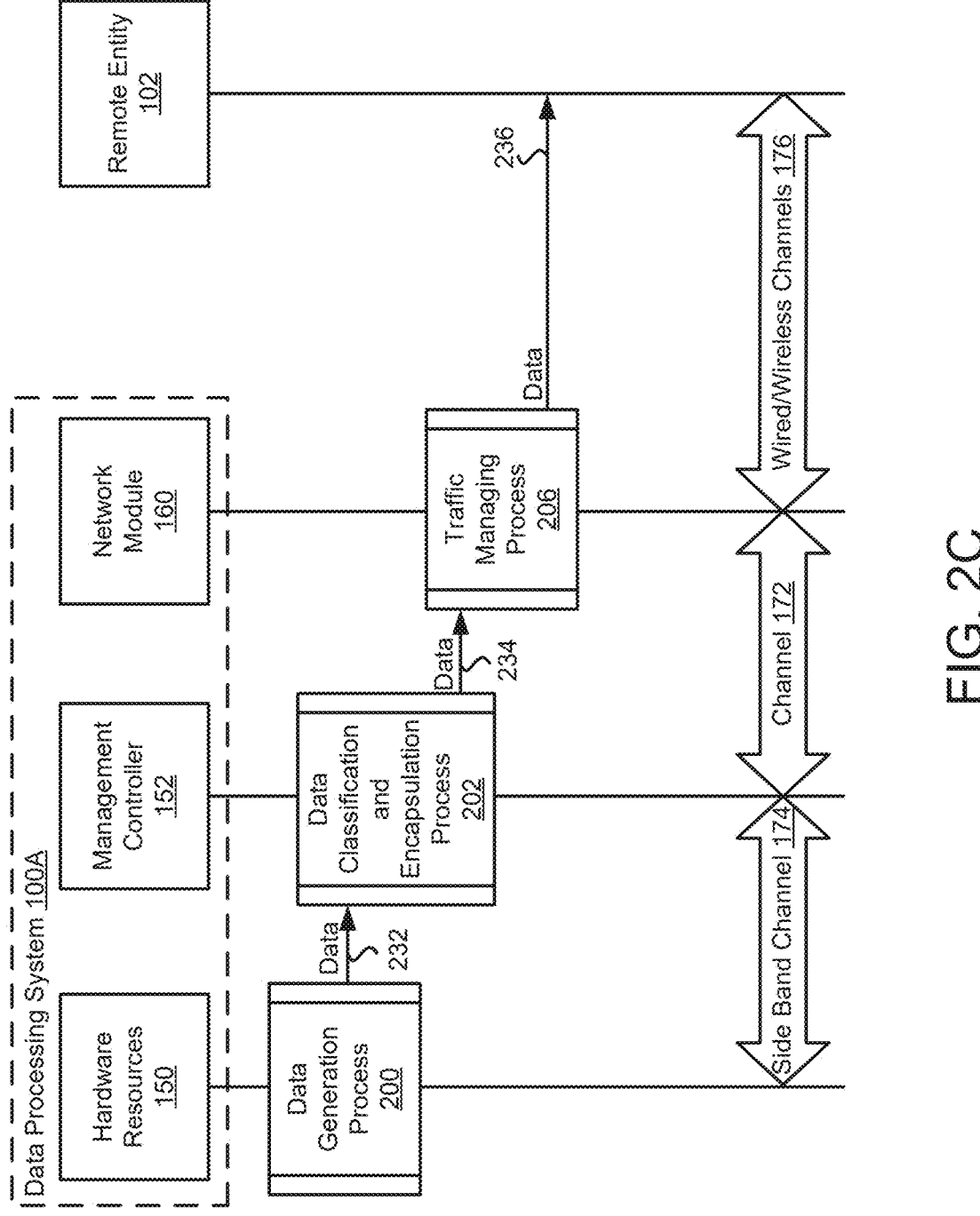

When providing its functionality, management controller 152 may perform all, or a portion, of the methods and operations described in FIGS. 2A-2C.

While illustrated in FIG. 1B with a limited number of specific components, a system may include additional, fewer, and/or different components without departing from embodiments disclosed herein.

Turning to FIG. 1C, to provide computer implemented services, hardware resources 150 may host applications 193 and management entities 194. Management entities 194 may include, for example, drivers, operating systems, and/or other entities that facilitate operation of applications 193 by facilitate use of hardware components 190. Hardware components 190 may include processors, memory modules, storage devices, and/or other types of hardware components usable to provide computer-implemented services.

Applications 193 may provide any quantity and type of computer implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

Additionally, management controller agent 195 may coordinate with management controller 152 (described in FIG. 1B) to provide data to a remote entity (e.g., remote entity 102). To do so, management controller agent 195 may (i) generate a data package, (ii) provide the data package to management controller 152, (iii) receive a data package from management controller 152 (e.g., containing data to be provided to the remote entity via an in-band communication channel), (iv) provide the data package from management controller 152 to a network module of the data processing system (e.g., network module 160), and/or (v) perform other tasks to assist in communicating data from the data processing system to the remote entity. Management controller agent 195 may also provide the data package to the network module via transmission paths that exclude management controller 152 (e.g., via channel 170 shown in FIG. 1B).

The data package may include (i) data generated by hardware components 190, (ii) control data usable to discriminate a transmission path for providing data to the remote entity from other transmission paths (e.g., generated by management controller agent 195, generated by management controller 152), and/or (iii) other data.

While illustrated in FIG. 1C with a limited number of specific components, a system may include additional, fewer, and/or different components without departing from embodiments disclosed herein.

To further clarify embodiments disclosed herein, interaction diagrams in accordance with an embodiment are shown in FIGS. 2A-2C. The interaction diagrams may illustrate examples of how data may be obtained and used within the systems of FIGS. 1A-1C.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 200, 202, etc.) superimposed over these lines.

Interactions (e.g., communication, data transmissions, etc.) between the components of the system are illustrated using a third set of shapes (e.g., 204, 208, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 204 may occur prior to the interaction labeled as 208. However, it will be appreciated that the processes and interactions may be performed in different orders, any may be omitted, and other processes or interactions may be performed without departing from embodiments disclosed herein.

The processes shown in FIGS. 2A-2C may be performed by any entity shown in the systems of FIGS. 1A-1C (e.g., a device similar to data processing system 100A, a device similar to remote entity 102, etc.) and/or another entity without departing from embodiments disclosed herein.

Turning to FIG. 2A, a first interaction diagram in accordance with an embodiment is shown. The first interaction diagram may illustrate processes and interactions that may occur in a first example where data generated by hardware resources of a data processing system (e.g., hardware resources 150) is provided to a remote entity (e.g., remote entity 102) via in-band communication channels (e.g., without involvement of out-of-band components and without transmission via an out-of-band communication channel).

To provide data generated by hardware resources 150 to remote entity 102, data generation process 200 may be performed. During data generation process 200, any type and/or quantity of data may be generated by any number of hardware components 190 (shown in FIG. 2C) of hardware resources 150 to be provided to remote entity 102. For example, hardware components 190 may generate telemetry data, which may include (i) data regarding performance metrics based on operation of the hardware resources (e.g., response times, latency, error rates), (ii) data regarding hardware resource utilization metrics (e.g., central processing unit (CPU) usage, memory usage), (iii) data regarding hardware resource health (e.g., heat output, number of damaged disk sectors of a hard drive), and/or (iv) other telemetry data. The telemetry data may be provided to remote entity 102 in order for remote entity 102 to provide device health management services for data processing system 100A.

Once the data has been generated by hardware resources 150, the data may be used to perform data classification and encapsulation process 202. During data classification and encapsulation process 202, an agent hosted by hardware resources 150 (e.g., management controller agent 195 shown in FIG. 1C) may obtain a classification for the data using a classification schema. The classification schema may take into account (i) a type of the data (e.g., telemetry data, location data, security data, user generated data), (ii) a sensitivity level of the data (e.g., a relative level of impact on processes performed by data processing system 100A should the data be intercepted by a malicious entity while the data is being provided to the remote entity), (iii) a geographic location of the data processing system, (iv) a level of trust in the remote entity (e.g., a likelihood that the remote entity will not act maliciously towards data processing system 100A, the level of trust being based on a trust grading system keyed to indicators of trust which data processing system 100A is able to evaluate), and/or (v) other characteristics of the data to be provided to remote entity 102. The trust grading system may be keyed to indicators of trust including (i) whether the remote entity can prove that it is in possession of a key, the key indicating it is a trusted entity, (ii) whether the remote entity has exhibited signs that it may be malicious (e.g., sent malformed packets, used certain communication protocols), (iii) whether other trusted entities can verify the trustworthiness of the remote entity, and/or (iv) other indicators.

Continuing with the above example, management controller agent 195 may obtain the telemetry data to be provided to remote entity 102. Management controller agent 195 may use the classification schema to classify the data, which may include (i) identifying the type of data as telemetry data, (ii) determining that the sensitivity level of the telemetry data is low (e.g., there may be little risk to the security of data processing system 100A should the telemetry data be intercepted by a malicious entity), (iii) determining data processing system 100A is at the home of a user of data processing system 100A (e.g., a low risk geographic location), and/or (iv) verifying that remote entity 102 has a high level of trust (e.g., management controller 152 has verified the trustworthiness of remote entity 102).

After obtaining a classification for the data, management controller agent 195 may use at least the classification and a rule set keyed to the classification to select a transmission path for the data. For example, the rule set may indicate which classifications of data are to be provided to remote entity 102 via a transmission path including an in-band communication channel, and which classifications of data are to be provided to remote entity 102 via a transmission path including an out-of-band communication channel. For example, the in-band communication channel may be more vulnerable to attacks by malicious entities. In that case, the rule set may indicate data with high sensitivity (e.g., data that poses a high security risk to data processing system 100A if intercepted by a malicious entity) is to be provided to remote entity 102 via a transmission path including the out-of-band communication channel. In another example, transmission of data via the in-band communication channel may pose a high security risk to data processing system 100A based on the geographic location of data processing system 100A (e.g., the data processing system is in a geographic location with a known data security risk). When sending data to remote entity 102 in a known high risk geographic location, the rule set may indicate the data is to be transmitted via a transmission path including the out-of-band communication channel (e.g., to lower the risk of the data becoming compromised).

Continuing with the above example, management controller agent 195 may use the classification for the telemetry data and a rule set to identify the transmission path to transmit the telemetry data to remote entity 102. Using the classification for the telemetry data as being low sensitivity, and that the telemetry data is to be transmitted from a low risk geographic location and to a trusted entity, the rule set may indicate the telemetry data is to be transmitted via a transmission path including an in-band communication channel.

The classification schema may also take into account the availability of communication channels when determining the transmission path to provide data to remote entity 102. For example, management controller 152 may be used to selectively power hardware resources 150, which may result in a hardware component (e.g., a processor) being powered while other in-band components (e.g., channel 170) are unpowered. Management controller 152 may, for example, selectively power a processor in order to run an installation program, which may generate reporting data to be provided to remote entity 102. When all communication channels are available (e.g., the in-band and out-of-band communication channels are powered), the classification schema may indicate that the reporting data is to be provided to remote entity 102 via the in-band communication channel. However, if in-band communication channels are unavailable (e.g., channel 170 is unpowered), the classification schema may indicate that the reporting data is to be provided to remote entity 102 via the out-of-band communication channel.

Once the transmission path is determined, the data may next be encapsulated during data classification and encapsulation process 202 to generate a data package. To encapsulate the data, management controller agent 195 may initiate generation of control data for the data, the control data being based, at least, on the classification, and the control data being usable to discriminate the transmission path from other transmission paths. The control data may be generated by management controller agent 195, and/or management controller agent 195 may instruct another entity to generate the control data (e.g., network module 160, management controller 152). Continuing with the above example, management controller agent 195 may generate control data for the telemetry data which, when read, indicates that a transmission path including an in-band communication channel is to be used to provide the telemetry data to remote entity 102.

The data package (e.g., the data and the control data) may be provided to network module 160 at interaction 204 via in-band channel 170. Network module 160 may use the data package to perform traffic managing process 206. During traffic managing process 206, traffic manager 162 (shown in FIG. 1B) may read the control data and use it to select a transmission path to provide the data to remote entity 102. Refer to the discussion of packet processing and matching processes by traffic manager 162 in FIG. 1B for additional details.

Based on the transmission path, traffic manager 162 may identify a channel between data processing system 100A and remote entity 102 (e.g., of wired/wireless channels 176) for transmission of the data and provide the data to remote entity 102 via the identified channel at interaction 208. Continuing with the above example, traffic manager 162 may read the control data included in the data package which may allow traffic manager 162 to identify a transmission path for the telemetry data including the in-band communication channel. The telemetry data may then be provided by network module 160 to remote entity 102 via the in-band communication channel.

While described with respect to transmitting data generated by hardware resources 150 to remote entity 102 via the in-band communication channel, it will be appreciated that the data may also be transmitted via the out-of-band communication channel (e.g., if the out-of-band communication channel is selected based on the classification for the data) without departing from embodiments disclosed herein.

Thus, as shown in FIG. 2A, data generated by hardware resources of a data processing system may be transmitted to a remote entity via in-band communication channels. The data may be classified by an agent hosted by the hardware resources, and encapsulated with control data based on the classification and usable to determine the transmission path for the data. The data may then be provided to a network module of the data processing system, which may use the control data to select a communication channel to transmit the data. The data may then be provided to the remote entity via the selected communication channel.

Turning to FIG. 2B, a second interaction diagram in accordance with an embodiment is shown. The second interaction diagram may illustrate processes and interactions that may occur in a second example where data generated by a management controller of a data processing system (e.g., management controller 152) is provided to a remote entity (e.g., remote entity 102) via out-of-band communication channels (e.g., without involvement of in-band components and without transmission via an in-band communication channel).

To provide data generated by management controller 152 to remote entity 102, data generation process 220 may be performed. During data generation process 220, any type and/or quantity of data may be generated by management controller 152 to be provided to remote entity 102. For example, management controller 152 may provide security management services for data processing system 100A. As part of providing the security management services, management controller 152 may generate security data, which may include (i) data regarding a security state of data processing system 100A (e.g., detection of malware indicating a compromised security state), (ii) data regarding user access patterns (e.g., detection of unusual user access patterns indicating unauthorized use and/or access of data processing system 100A), and/or (iii) other security data. For example, management controller 152 may generate security data indicating that data processing system 100A is likely infected with malware, which may have compromised hardware resources 150 (e.g., the in-band components of data processing system 100A). The security data may be provided to remote entity 102 in order for remote entity 102 to assist in providing the security management services for data processing system 100A.

Once the data has been generated by management controller 152, the data may be used to perform data classification and encapsulation process 202. During data classification and encapsulation process 202, management controller 152 may classify the data, select a transmission path based on at least the classification and a rule set keyed to the classification, generate and/or initiate generation of control data, and/or encapsulate the data with the control data. Refer to the discussion of FIG. 2A for additional details regarding data classification and encapsulation process 202.

Continuing with the above example, management controller 152 may need to provide the security data indicating malware has been detected on data processing system 100A to remote entity 102 in order for remote entity 102 to provide computing instructions to remove the malware from data processing system 100A. To provide the security data to remote entity 102, management controller 152 may use a classification schema to classify the security data, which may include (i) identifying the type of data as security data, (ii) determining that the sensitivity level of the security data is high (e.g., there may be a high risk to the security of data processing system 100A should the security data be intercepted by a malicious entity), (iii) determining data processing system 100A is at the workplace of a user of data processing system 100A (e.g., a low risk geographic location), and/or (iv) verifying that remote entity 102 has a high level of trust (e.g., management controller 152 has verified the trustworthiness of remote entity 102).

Using the classification for the security data, management controller 152 may use a rule set keyed to the classification to select a transmission path for the security data. The rule set may indicate the security data is to be transmitted via a transmission path including an out-of-band communication channel (e.g., without traversing the in-band components which have been potentially compromised by the malware). Management controller 152 may generate control data for the security data which, when read, indicates that a transmission path including an out-of-band communication channel is to be used to provide the security data to remote entity 102.

The data package (e.g., the data and the control data) may be provided to network module 160 at interaction 224 via out-of-band channel 172. Network module 160 may use the data package to perform traffic managing process 206. Refer to the discussion of FIG. 2A for additional details regarding traffic managing process 206.

Continuing with the above example, traffic manager 162 may read the control data included in the data package which may allow traffic manager 162 to identify a transmission path for the security data including the out-of-band communication channel. The security data may then be provided by network module 160 to remote entity 102 at interaction 226 via the out-of-band communication channel (e.g., of wired/wireless channels 176).

While described with respect to transmitting data generated by management controller 152 to remote entity 102 via the out-of-band communication channel, it will be appreciated that the data may also be transmitted via the in-band communication channel (e.g., if the in-band communication channel is selected based on the classification for the data) without departing from embodiments disclosed herein.

For example, management controller 152 may suspect that data being transmitted by management controller 152 via the out-of-band communication channel is at risk of interception by a malicious entity. In that case, the classification schema may dynamically adjust to the change in the security posture of data processing system 100A. For example, data from management controller 152 that would be transmitted via a transmission path including the out-of-band communication channel based on the classification schema under low security risk conditions may be transmitted via a transmission path including the in-band communication channel based on the classification schema under high security risk conditions (e.g., in order to disguise the data). Thus, the classification schema may change based on the current state of data processing system 100A, resulting in data generated by management controller 152 being transmitted via the in-band communication channel.

Thus, as shown in FIG. 2B, data generated by a management controller of a data processing system may be transmitted to a remote entity via out-of-band communication channels. The data may be classified by the management controller, and encapsulated with control data based on the classification and usable to determine the transmission path for the data. The data may then be provided to a network module of the data processing system, which may use the control data to select a communication channel to transmit the data. The data may then be provided to the remote entity via the selected communication channel.

Turning to FIG. 2C, a third interaction diagram in accordance with an embodiment is shown. The third interaction diagram may illustrate processes and interactions that may occur in a third example where data generated by hardware resources of a data processing system (e.g., hardware resources 150) is provided to a remote entity (e.g., remote entity 102) via out-of-band communication channels (e.g., data generated by in-band components transmitted via an out-of-band communication channel).

To provide data generated by hardware resources 150 to remote entity 102, data generation process 200 may be performed by hardware resources 150. Refer to FIG. 2A for additional details regarding data generation process 200. For example, data processing system 100A may be a portable device (e.g., a laptop computer). Hardware resources 150 may generate location data, the location data indicating a geographic location of data processing system 100A. The location data may be provided to remote entity 102 in order for remote entity 102 to provide location-based services. For example, the location data may be provided to remote entity 102 automatically, in order for remote entity 102 to ensure data processing system 100A is in compliance with location-dependent policies (e.g., allowed firmware updates for hardware components of data processing system 100A, allowed startup procedures).

Once the data has been generated by hardware resources 150, the data may be provided to management controller 152 at interaction 232 via side band channel 174. Management controller 152 may use the data to perform data classification and encapsulation process 202. Management controller 152 may perform data classification and encapsulation process 202, rather than an agent hosted by hardware resources 150 (e.g., management controller agent 195), for reasons including (i) management controller 152 performs data classification and encapsulation process 202 for all data to be provided to any remote entity, regardless of the component that generated the data, (ii) management controller agent 195 is unable to perform data classification and encapsulation process 202 (e.g., due to loss of power, due to compromise resulting in loss of functionality), and/or (iii) other reasons. Refer to the discussion of FIG. 2A for additional details regarding data classification and encapsulation process 202.

Continuing with the above example, management controller 152 may use a classification schema to classify the location data, which may include identifying that the sensitivity of the data is high (e.g., if a malicious party intercepted the location data, the location data could be used to perform unauthorized tracking of the user of data processing system 100A). Using the classification for the location data as being high sensitivity, management controller 152 may use a rule set keyed to the classification to select a transmission path including an out-of-band communication channel. Management controller 152 may generate control data and encapsulate the location data with the control data indicating the out-of-band transmission path (e.g., generate a data package), and provide the data package to network module 160 at interaction 234 via out-of-band channel 172. Network module 160 may use the data package to perform traffic managing process 206. Refer to the discussion of FIG. 2A for additional details regarding traffic managing process 206. The location data may be provided to remote entity 102 at interaction 236 via the out-of-band communication channel (e.g., of wired/wireless channels 176).

While described with respect to data generated by hardware resources then classified and encapsulated by a management controller of the data processing system, it will be appreciated that the data may also be generated by the management controller then classified and encapsulated by an agent hosted by the hardware resources without departing from embodiments disclosed herein.

Thus, as shown in FIG. 2C, data generated by hardware resources of a data processing system may be provided to a management controller to perform classification and encapsulation processes. The data may then be provided to a network module of the data processing system, which may then provide the data to the remote entity via a communication channel based on the classification.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to manage the communication capabilities of data processing systems. FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources) and/or another device.

Turning to FIG. 3, a flow diagram illustrating a method of managing a data processing system in accordance with an embodiment is shown. The method may be performed, for example, by a data processing system, a remote entity, a communication system, a management controller of a data processing system, hardware resources of a data processing system, and/or any other entity without departing from embodiments disclosed herein.

At operation 300, data may be obtained to be provided to a remote entity. Obtaining the data may include (i) generating the data by hardware resources of the data processing system, (ii) generating the data by a management controller of the data processing system, (iii) reading the data from a storage location (e.g., by an agent hosted by the hardware resources, by the management controller), and/or (iv) other methods.

At operation 302, a classification for the data may be obtained using a classification schema. Obtaining the classification may include (i) obtaining the classification schema, the classification schema taking into account, at least: a type of the data, a sensitivity level of the data, a geographic location of the data processing system, and a level of trust in the remote entity, (ii) selecting a classification for the data based on the classification schema by the management controller, (iii) selecting a classification for the data based on the classification schema by the agent hosted by the hardware resources, (iv) providing the data to another entity responsible for classifying the data using the classification schema, and/or (v) other methods.

At operation 304, a transmission path for the data may be selected based on at least the classification and a rule set keyed to the classification. Selecting the transmission path may include (i) obtaining the rule set keyed to the classification (e.g., by the management controller, by the agent hosted by the hardware resources), (ii) parsing the rule set keyed to the classification to determine which rules apply, (iii) selecting a rule from the rule set keyed to the classification to determine the transmission path for the data, (iv) generating control data (e.g., by the management controller, by the agent hosted by the hardware resources) which identifies the transmission path, (v) encapsulating the data with the control data, (vi) providing the classification to another entity responsible for using the rule set keyed to the classification to select a transmission path, and/or (vii) other methods.

At operation 306, a channel between the data processing system and the remote entity may be identified for transmission of the data based on the transmission path. Identifying the channel between the data processing system and the remote entity may include (i) determining whether the transmission path includes in-band components, (ii) determining whether the transmission path includes out-of-band components, (iii) selecting the communication channel based on the determination (e.g., selecting an in-band communication channel if it is determined the transmission path includes in-band components), and/or (iv) other methods.

At operation 308, a determination may be made regarding whether the channel (e.g., the identified channel) is an in-band communication channel. Making the determination may include (i) parsing the identification of the channel (e.g., from operation 306) to ascertain whether it includes the in-band communication channel, and/or (ii) other methods.

If it is determined that the communication channel is an in-band communication channel (e.g., the determination is "Yes" at operation 308), then the method may proceed to operation 310.

At operation 310, the data may be provided to the remote entity via the in-band communication channel. Providing the data to the remote entity via the in-band communication channel may include (i) obtaining, by the agent hosted by hardware resources of the data processing system, data generated by the hardware resources (e.g., receiving the data from the hardware resources, reading the data from a storage location used by the hardware resources to store data), (ii) initiating, by the agent, generation of control data for the data, the control data being based, at least, on the classification, and the control data being usable to discriminate the transmission path from other transmission paths (e.g., generating control data by the agent based on the classification for the data, providing the data to another entity responsible for generating the control data based on the classification), (iii) providing the data and the control data to a network module of the data processing system (e.g., sending the data to the network module via a message, providing the data to the management controller to transmit the data to the network module), (iv) transmitting, by the network module, the data to the remote entity via the in-band communication channel based at least on the control data (e.g., reading the control data by the network module to ascertain the data is to be transmitted via the in-band communication channel, selecting a port to transmit the data which corresponds to the in-band communication channel), and/or (v) other methods.

The method may end following operation 310.

Returning to operation 308, if it is determined that the communication channel is not an in-band communication channel (e.g., the determination is "No" at operation 308), then the method may proceed to operation 312.

At operation 312, the data may be provided to the remote entity via the out-of-band communication channel. Providing the data to the remote entity via the out-of-band communication channel may include (i) obtaining, by the management controller, data to be provided to a remote entity (e.g., receiving the data from the hardware resources via a message, reading the data from a storage location used by the hardware resources to store data, generating the data), (ii) determining the data is to be provided to the remote entity via the out-of-band communication channel (e.g., classifying the data, using the rule set keyed to the classification to select the transmission path, identifying the transmission path includes the out-of-band communication channel) (iii) initiating, by the management controller, generation of control data for the data (e.g., generating control data by the management controller based on the classification for the data, providing the data to another entity responsible for generating the control data based on the classification), (iv) providing the data to the remote entity via the out-of-band communication channel (e.g., providing the data and the control data to the network module, transmitting by the network module the data to the remote entity via the out-of-band communication channel), and/or (v) other methods.

The method may end following operation 312.

Using the methods illustrated in FIG. 3, embodiments disclosed herein may provide systems and methods usable to provide communication management services for a data processing system.

Figure 4:
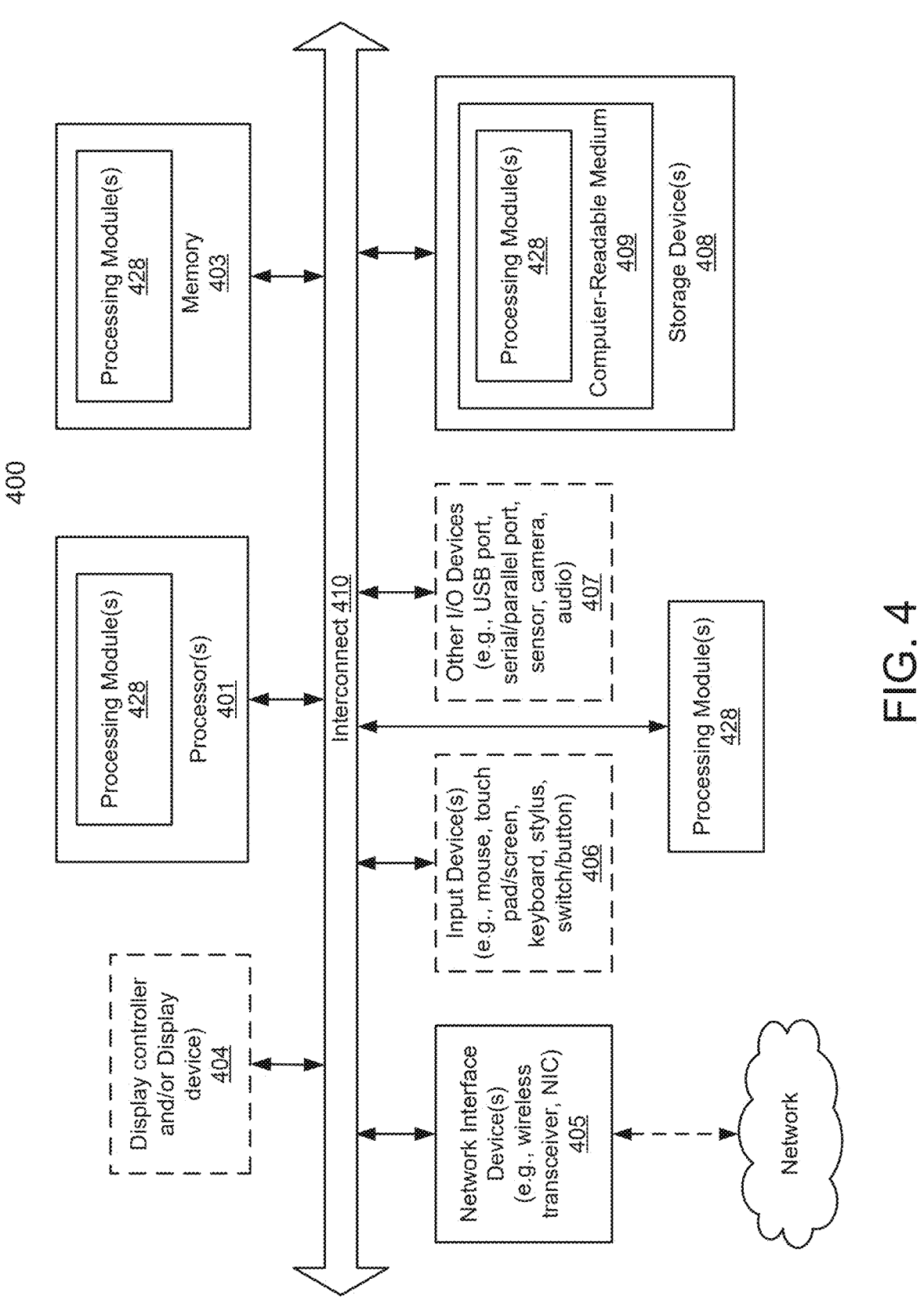
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

obtaining data to be provided to a remote entity;

obtaining, using a classification schema, a classification for the data;

selecting, based on at least the classification and a rule set keyed to the classification, a transmission path for the data;

identifying, based on the transmission path, a channel between the data processing system and the remote entity for transmission of the data;

in a first instance of the identifying in which the channel is an in-band communication channel used by hardware resources of the data processing system:

providing, via the in-band communication channel, the data to the remote entity; and in a second instance of the identifying in which the channel is an out-of-band communication channel used by a management controller of the data processing system:

providing, via the out-of-band communication channel, the data to the remote entity, the management controller being a first computing device that is physically installed in and operates independently from a second computing device configured as the data processing system, and the management controller not being one of the hardware resources of the data processing system.

2. The method of claim 1, wherein the classification takes into account, at least:

a type of the data;

a sensitivity level of the data;

a geographic location of the data processing system; and a level of trust in the remote entity.

3. The method of claim 2, wherein the type of data comprises at least one type of data selected from a list consisting of:

telemetry data;

location data;

security data; and user generated data.

4. The method of claim 2, wherein the sensitivity level of the data indicates a relative level of impact on processes performed by the data processing system should the data be intercepted by a malicious entity while the data is being provided to the remote entity.

5. The method of claim 2, wherein the level of trust in the remote entity indicates whether the remote entity will or will not act maliciously towards the data processing system, the level of trust being based on a trust grading system keyed to indicators of trust which the data processing system is able to evaluate.

6. The method of claim 1, wherein providing the data to the remote entity via the in-band communication channel comprises:

obtaining, by an agent hosted by hardware resources of the data processing system, data generated by the hardware resources;

initiating, by the agent, generation of control data for the data, the control data being based, at least, on the classification, and the control data being usable to discriminate the transmission path from other transmission paths;

providing the data and the control data to a network module of the data processing system; and transmitting, by the network module, the data to the remote entity via the in-band communication channel based at least on the control data.

7. The method of claim 1, wherein the data processing system comprises a single network module that is shared by both the hardware resources and the management controller, the single network module being adapted to separately advertise network endpoints for the management controller and the hardware resources, and the network endpoints being usable by the remote entity to address first communications to the hardware resources using the in-band communication channel and second communications separately to the management controller using the out-of-band communication channel.

8. The method of claim 7, wherein the management controller and the single network module are on separate power domains from the hardware resources so that the management controller and the single network module are operable while the hardware resources are inoperable.

9. The method of claim 7, wherein the out-of-band communication channel runs through the single network module, and the in-band communication channel that services the hardware resources also runs through the single network module.

10. The method of claim 7, wherein the single network module hosts a transmission control protocol/internet protocol (TCP/IP) stack to facilitate network communications via the out-of-band communication channel.

11. A non-transitory machine-readable medium having instructions stored therein, which when executed by a processor, cause the processor to perform operations for managing operation of a data processing system, the operations comprising:

obtaining data to be provided to a remote entity;

obtaining, using a classification schema, a classification for the data;

selecting, based on at least the classification and a rule set keyed to the classification, a transmission path for the data;

identifying, based on the transmission path, a channel between the data processing system and the remote entity for transmission of the data;

in a first instance of the identifying in which the channel is an in-band communication channel used by hardware resources of the data processing system:

providing, via the in-band communication channel, the data to the remote entity; and in a second instance of the identifying in which the channel is an out-of-band communication channel used by a management controller of the data processing system:

providing, via the out-of-band communication channel, the data to the remote entity, the management controller being a first computing device that is physically installed in and operates independently from a second computing device configured as the data processing system, and the management controller not being one of the hardware resources of the data processing system.

12. The non-transitory machine-readable medium of claim 11, wherein the classification takes into account, at least:

a type of the data;

a sensitivity level of the data;

a geographic location of the data processing system; and a level of trust in the remote entity.

13. The non-transitory machine-readable medium of claim 12, wherein the type of data comprises at least one type of data selected from a list consisting of:

telemetry data;

location data;

security data; and user generated data.

14. The non-transitory machine-readable medium of claim 12, wherein the sensitivity level of the data indicates a relative level of impact on processes performed by the data processing system should the data be intercepted by a malicious entity while the data is being provided to the remote entity.

15. The non-transitory machine-readable medium of claim 12, wherein the level of trust in the remote entity indicates whether the remote entity will or will not act maliciously towards the data processing system, the level of trust being based on a trust grading system keyed to indicators of trust which the data processing system is able to evaluate.

16. A data processing system, comprising:

a processor; and a memory coupled to the processor to store instructions, which when executed by the processor, cause the processor to perform operations for managing operation of the data processing system, the operations comprising:

obtaining data to be provided to a remote entity;

obtaining, using a classification schema, a classification for the data;

selecting, based on at least the classification and a rule set keyed to the classification, a transmission path for the data;

identifying, based on the transmission path, a channel between the data processing system and the remote entity for transmission of the data;

in a first instance of the identifying in which the channel is an in-band communication channel used by hardware resources of the data processing system:

providing, via the in-band communication channel, the data to the remote entity; and in a second instance of the identifying in which the channel is an out-of-band communication channel used by a management controller of the data processing system:

providing, via the out-of-band communication channel, the data to the remote entity, the management controller being a first computing device that is physically installed in and operates independently from a second computing device configured as the data processing system, and the management controller not being one of the hardware resources of the data processing system.

17. The data processing system of claim 16, wherein the classification takes into account, at least:

a type of the data;

a sensitivity level of the data;

a geographic location of the data processing system; and a level of trust in the remote entity.

18. The data processing system of claim 17, wherein the type of data comprises at least one type of data selected from a list consisting of:

telemetry data;

location data;

security data; and user generated data.

19. The data processing system of claim 17, wherein the sensitivity level of the data indicates a relative level of impact on processes performed by the data processing system should the data be intercepted by a malicious entity while the data is being provided to the remote entity.

20. The data processing system of claim 17, wherein the level of trust in the remote entity indicates whether the remote entity will or will not act maliciously towards the data processing system, the level of trust being based on a trust grading system keyed to indicators of trust which the data processing system is able to evaluate.

* * * * *